United States Patent
Takada

[15] 3,695,546
[45] Oct. 3, 1972

[54] SAFETY BELT RETRACTOR REEL LOCKING MECHANISM

[72] Inventor: Takezo Takada, Hikone, Japan

[73] Assignee: Takata Kojyo Co., Ltd., Tokyo, Japan

[22] Filed: Dec. 2, 1970

[21] Appl. No.: 94,375

[52] U.S. Cl...........................242/107.4, 242/107.6
[51] Int. Cl..............................................A62b 35/00
[58] Field of Search........242/107 R, 107 SB, 107.12, 242/107.2, 107.4, 107.6, 107.7; 297/388; 280/150 SB

[56] References Cited

UNITED STATES PATENTS

| | | | |
|---|---|---|---|
| 3,550,875 | 12/1970 | Settimi | 242/107.4 |
| 3,240,510 | 3/1966 | Spouge | 242/107.4 X |
| 3,206,137 | 9/1965 | Snyderman | 242/107.4 |
| 3,211,496 | 10/1965 | Zaydel | 242/107 SB |
| 3,491,966 | 1/1970 | Curran et al | 242/107.4 |
| 3,512,730 | 5/1970 | Board et al. | 242/107.4 |

Primary Examiner—Werner H. Schroeder
Attorney—Stanley Wolder

[57] ABSTRACT

A spring rewound safety belt retraction reel is releasably locked in a belt retracted condition, to relieve the spring rewinding tension on the extended belt, by a swingable latching member which is spring urged into engagement with a reel mounted abutment when the belt is partially or fully withdrawn. In one form the locking abutment is covered by the wound belt and is exposed for locking engagement when the belt is fully withdrawn and in another form the abutment is located on the reel flange and the latching member is held by the wound belt out of locking engagement with the abutment until the belt is at least partially withdrawn. A selectively manipulated member is connected to the locking member to facilitate its release.

7 Claims, 11 Drawing Figures

PATENTED OCT 3 1972 3,695,546

INVENTOR
TAKEZO TAKADA
BY
ATTORNEY

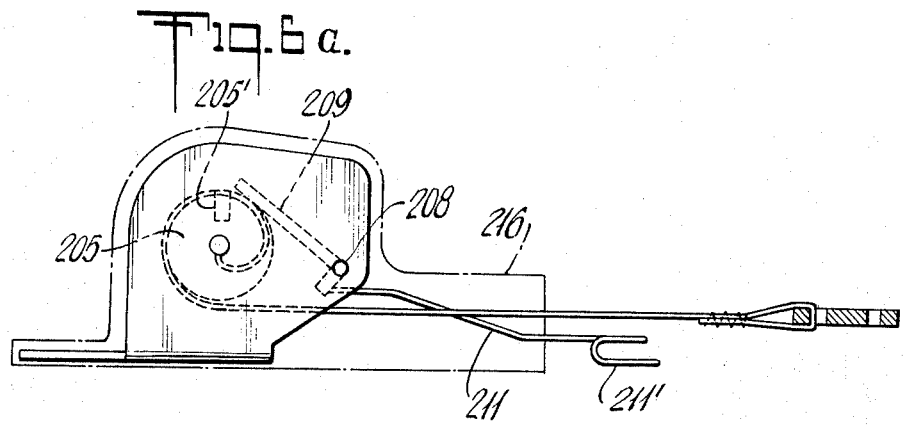
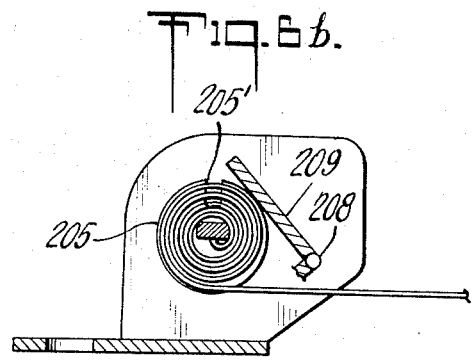
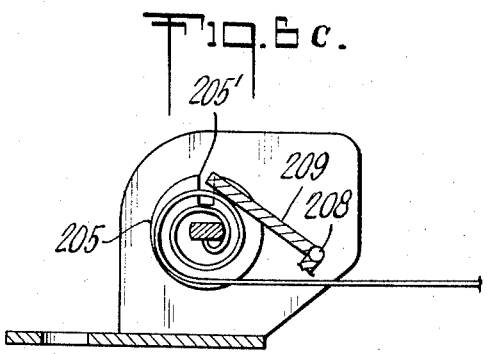
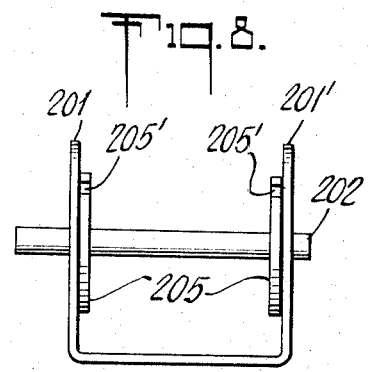
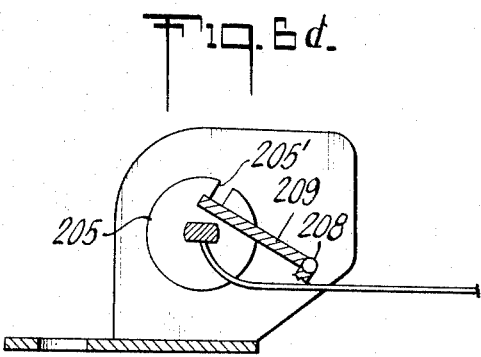

SAFETY BELT RETRACTOR REEL LOCKING MECHANISM

BACKGROUND OF THE INVENTION

The present invention relates generally to improvements in vehicle safety belt devices and it relates particularly to an improved belt retractor reel.

In the conventional vehicle seat belt retractor reel, the belt is either withdrawn its full length or only for a portion of its length as effected by the braking of the forward rotation of the reel. However, the reel, under the influence of a loaded rewinding spring continuously urges the belt towards its retracted position. The retractive force is transmitted by the belt to the occupant and is highly uncomfortable and applies a greatly oppressive pressure to the belted and these reels possess numerous draw-backs and leave much to be desired.

SUMMARY OF THE INVENTION

It is a principal object of the present invention to provide an improved vehicle safety belt mechanism.

Another object of the present invention is to provide an improved safety belt retractor reel.

Still another object of the present invention is to provide an improved belt retractor reel in which the discomfort to the passenger attendant to the retractor force imparted to the belt by the reel is obviated.

The above and other objects of the present invention will become apparent from a reading of the following description taken in conjunction with the accompanying drawings which illustrate preferred embodiments thereof.

In a sense the present invention contemplates the provision of a safety belt retractor comprising a reel including a shaft, a belt connected to and windable on the reel shaft, the reel being rotated in a first direction with the withdrawal of the belt and rotatable in a second opposite direction to retract the belt, a windup spring urging the reel to rotate in said second direction, a movable locking member resiliently urged toward engagement with the shaft and restricted against said engagement by the belt wound on the reel, means responsive to the locking member engaging the shaft for releasably locking the reel against rotation in the second direction, and selectively actuated means for releasing the locking means. The locking member is advantageously a rockably mounted lever and includes a stop element releasably engaging a shoulder rotatable with the shaft.

The improved reel is simple, rugged and reliable, and positively releasably locks the reel against retraction of the withdrawn belt and hence relieves the pressure on the seat occupant.

BRIEF DESCRIPTION OF THE DRAWINGS

FIG. 5 is an exploded perspective view thereof;

FIG. 8 is an end elevational view of the bracket and reel assembly thereof.

DESCRIPTION OF THE PREFERRED EMBODIMENTS

Figure 1:
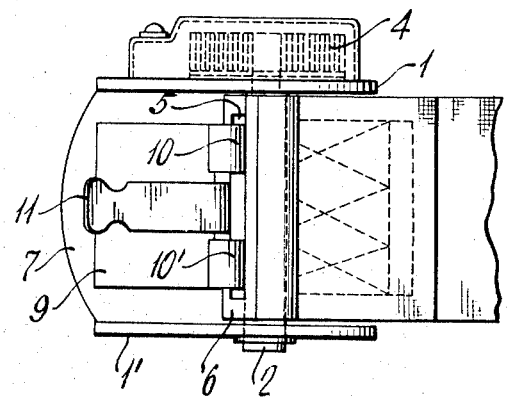
FIG. 1 is a top plan view of a retractor reel embodying the present invention shown in a belt extended condition.
Figure 2:
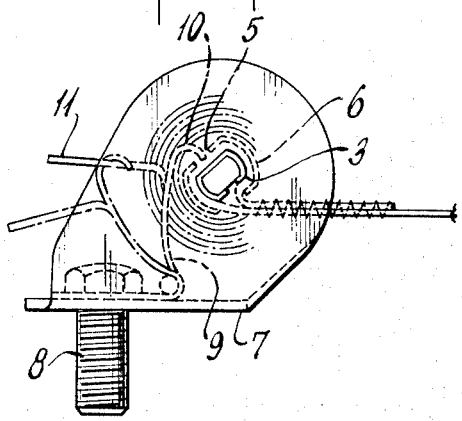
FIG. 2 is a side elevational view thereof.

Referring now to the drawings, particularly FIGS. 1 and 2 thereof which illustrate a preferred embodiment of the present invention the reference numerals 1 and 1' generally designate the side plates or frames of the bracket of the improved retractor. A rotatable shaft 2 extends between plates 1 and 1' and has attached thereto by means of a split sleeve 3, the looped end of a safety belt through which it extends. A housed, coiled rewind spring 4 has an end connected to an end of shaft 2 and urges the shaft to a belt rewind or retracted position. A sleeve 6 engages the inner looped end of the safety belt which engages the sleeve 3 and is provided with a slot 5 an edge of which defines a locking shoulder or abutment of the reel locking mechanism. The reel bracket includes a base plate 7 suitably secured in position by a bolt 8 and to which a resilient stop or locking member 9 is suitably rockably mounted and is provided with inwardly projecting stop elements 10 which are urged into engagement with respective apertures 5 under the influence of stop member 9. Projecting longitudinally outwardly from the stop member 9 is a handle member 11. It should be noted that while only two locking apertures 5 and two stop elements 10 are illustrated, any desired number may be employed. Moreover, collar 6 and stop member 9 may be formed of a suitable metal or synthetic resin.

Considering the operation of the retractor reel, when the belt is in its fully retracted position as effected by rewind spring 4, the belt is wound on the reel and the stop elements 10 are resiliently urged into sliding engagement with the outside face of the reel wound belt. Upon full withdrawal of the belt, the shaft 2 is turned to load spring 4 and apertures 5 are exposed by the unwound belt and the stop elements 10 are urged into engagement therewith to releasably lock the reel in its spring loaded unwound condition. Accordingly no force is transmitted to the withdrawn belt and no oppressive force is, as a result, applied to the occupant. When the belt is to be released it is unbuckled and handle member 11 pulled outwardly to retract stop elements 11 from apertures 5 whereby to unlock and release the reel which is rotated by spring 4 to rewind the belt to its retracted position. Other arrangements may be substituted for stop members 6 and 9 to releasably lock the reel according to the present invention.

Figure 3:
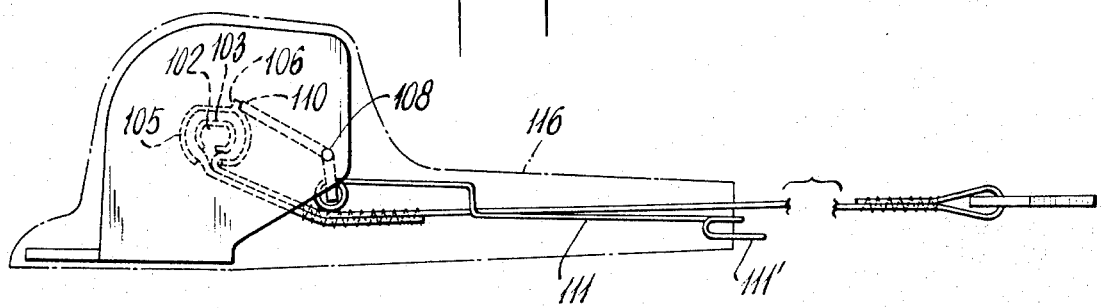
FIG. 3 is a side elevational view of another embodiment of the present invention illustrated in a belt extended condition.
Figure 4:
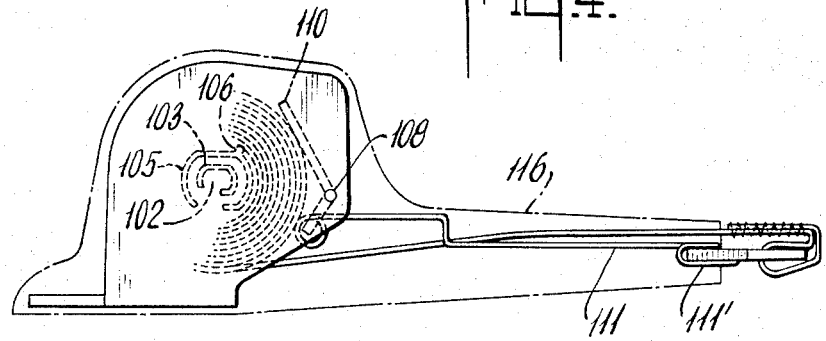
FIG. 4 is a view similar to FIG. 3 with the belt shown in its retracted condition.

In FIG. 3 to 5 there is illustrated another embodiment of the present invention in which a bracket member includes side plates 101, 101' and a shaft 102 extends between and is journalled to plates 101, 101' and is urged to rotate in a belt retracting direction by a suitably housed rewind spring 104 engaging an end of shaft 102 to retract and wind the belt. A split collar 103 engaging the shaft 102 telescopes the looped end of the safety belt to secure it to the shaft."

A second collar engages the outer face of the belt loop on shaft 102 and is provided with a longitudinal slot 105 bordered by a longitudinally extending stop shoulder defining strip 106. The bracket base plate 107 is provided with an anchor bolt receiving aperture and bracket plates 101 and 101' are provided with axially aligned openings which are engaged by transverse pivot pins 108 transversely projecting from an angulated stop member 109 terminating at its top in a stop element 110, the stop member 109 being rockable about the axis of pins 108 to move stop element 110 into and out of engagement with shoulder 106.

A spring 112 engages lock member 109 to urge it counterclockwise toward its reel locking position. A centrally apertured circular plate 113 and a split lock ring 114 engage shaft 102 to prevent its axial movement and the coil spring housing is secured in position by a set screw 115. Extending longitudinally from and secured to the bottom of lock member 109 is a push member 111 provided at its free end with a buckle plate receiving pocket 111' and the reel assembly and push member are enclosed by a protective cover 116. While the push member 111 is illustrated as formed of wire it may be formed of sheet material as well.

In the belt retracted position of the retractor reel last described as shown in FIG. 4, lock member 109 is in its unlock clockwise position urged counter-clockwise by spring 112 into engagement with the belt wound on the reel. The belt buckle plate is inserted in the pocket 111. When the belt is withdrawn it is unwound from the reel until the shoulder 106 is uncovered by the belt and moves counter-clockwise past the stop element 110 and the reel is thus prevented from rewinding the belt since the stop element 110 is in the return path of and abuts the shoulder 106. By pushing member 111 inwardly stop member 109 is rocked to swing stop element 110 out of the path of shoulder 106 and permits the spring rotation of the reel and the rewinding and retraction of the belt which covers the shoulder 106 so as to maintain the reel in its unlocked condition.

Figure 6:
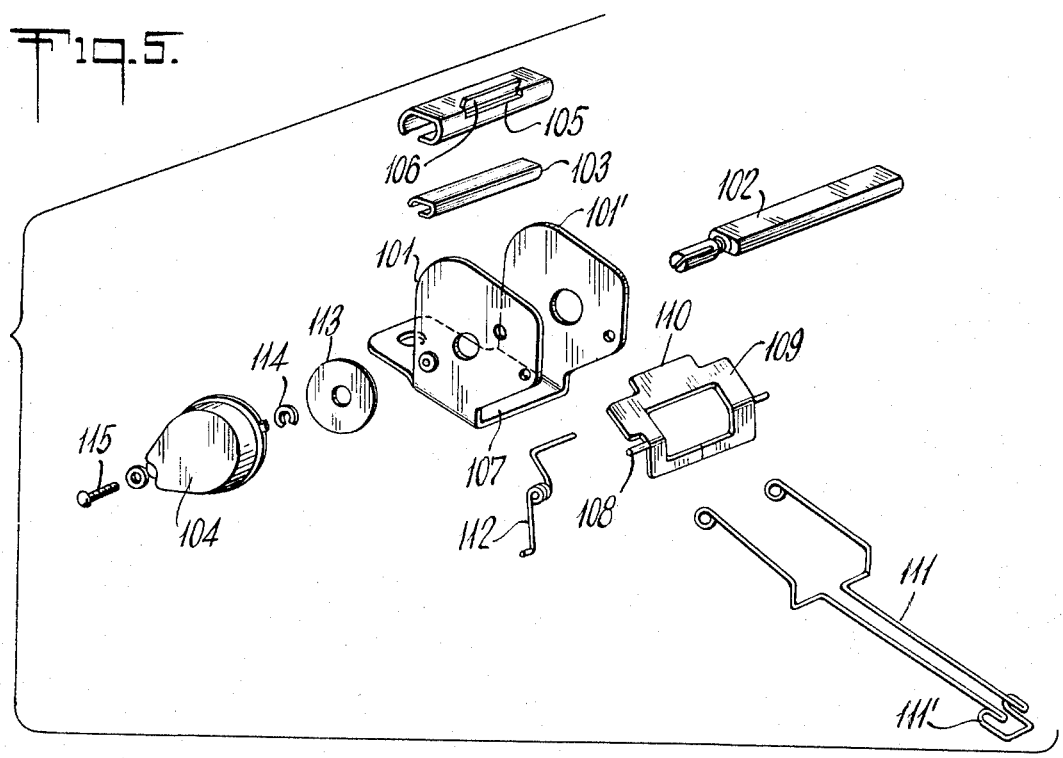
FIGS. 6 (a) to (d) are side elevational views of another reel embodying the present invention shown in successive stages from the belt fully retracted to fully withdrawn position.
Figure 7:
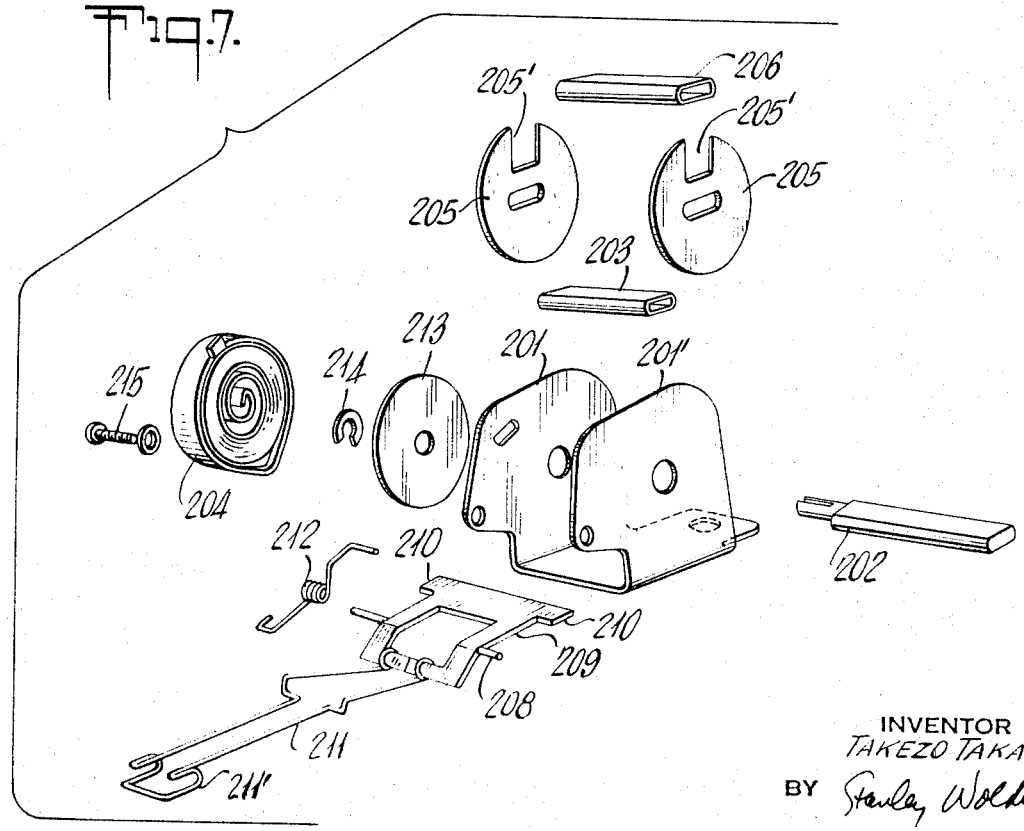
FIG. 7 is an exploded perspective view thereof.

Referring now to FIGS. 6 to 8 of the drawings which illustrates another embodiment of the present invention which differs from that last described primarily in that the stop shoulders are formed on the reel flanges and are not masked by the belt. Specifically the retractor reel includes a bracket having side plates 201 and 201' which rotatably support a wind-up shaft 202 which is urged in a rewind direction by a housing enclosed windup spring 204 engaging the shaft. The shaft is restricted against axial movement by an annulus 213 and a lock ring 214 engaging the shaft end section and the spring housing is secured to a bracket plate by a screw 215.

A pair of circular plates 205 having radially extending recesses 205' formed in their peripheral edges are mounted on and are rotatable with shaft 202 and positioned along the inside faces of plates 201 and 201'. An angulated stop member 209 is rockably supported between bracket plates 201 and 201' by pins 208 transversely projecting from stop member 209 into engagement with apertures in the bracket plates. A suitably mounted spring 212 urges stop member 209 in a counter-clockwise direction as viewed in FIG. 6, stop member 209 being provided at its upper outer end with laterally projecting stop elements 210 which are urged toward engagement with recesses 205' by the spring biased stop member 209. A push member 211 extends longitudinally from the bottom of stop member 209 and terminates in a pocket 211'. The collars 203 and 206 the belt and shaft in the manners of collars 103 and 106 previously described.

In the operation of the reel last described, withdrawal of the belt is normally permitted by reason of the locking elements being restrained from locking engagement with recesses 205' by the belt wound on the reel bearing on the inside face of stop member 209. However, upon withdrawal of a sufficient length of the belt, as shown in FIG. 6 (c), even though some turns of the belt remain on the reel, the spring biased stop member is permitted to swing the stop elements 210 into locking engagement with recesses 205'. If it is desired to withdraw a further turn of belt or the full length of belt, the member 211 is pushed in to retract stop elements 210 from recesses 205' and the belt withdrawn the desired amount and push member 409 is then released to permit reengagement of recesses 205' by stop elements 210 and the locking of the reel.

I claim:

1. A safety belt retractor comprising a reel including a shaft, a belt connected to and windable on said reel shaft, said reel being rotated in a first direction with the withdrawal of said belt and rotatable in a second opposite direction to retract said belt, a windup spring urging said reel to rotate in said second direction, a movable locking member resiliently urged toward engagement with said shaft and restricted against said engagement by the belt wound on said reel, means responsive to said locking member engaging said shaft for releasably locking said reel against rotation in said second direction, and selectively actuated means for releasing said locking means.

2. The safety belt retractor of claim 1 wherein said locking means releasably locks said reel against rotation in any direction.

3. The safety belt retractor of claim 1 wherein said locking means comprises means defining a shoulder rotatable with said reel and facing said second direction, said movable locking member being resiliently urged toward engagement with said shoulder.

4. The safety belt retractor of claim 3 wherein said reel includes a peripheral flange rotatable therewith and having a recess formed in the periphery thereof, an edge of said recess defining said shoulder, and a belt sensing member mounted on said locking member and movable with the movement of said locking member into engagement with said belt on said reel.

5. The safety belt retractor of claim 3 wherein said release means comprises a finger piece connected to said locking member.

6. A safety belt retractor comprising a reel including an axial shaft, a belt connected to and windable on said shaft, said reel being rotated in a first direction with the withdrawal of said belt and rotatable in a second opposite direction to retract said belt, a windup spring urging said reel to rotate in said second direction, means defining a shoulder located on and rotatable with said shaft and facing said second direction and being covered by the belt wound on said shaft, releasable locking means including a movable locking member resiliently urged toward engagement with said shoulder and restricted against said engagement by the belt wound on said shaft, and selectively actuated means for releasing said locking means.

7. A safety belt retractor comprising a bracket having a pair of spaced arms, a reel extending between and rotatably supported by said arms, a belt connected to said reel, said reel being rotated in a first direction with the withdrawal of said belt and rotatable in a second opposite direction to retract said belt, a windup spring urging said reel to rotate in said second direction, means defining a shoulder rotatable with said reel and facing said second direction, a windup spring urging said reel to rotate in said second direction, a locking lever having an element proximate a first end thereof movable into and out of engagement with said shoulder and restricted against said engagement by the belt wound on said reel, said lever being mounted on said bracket for rocking about an axis between the ends of said lever, and release means including a push member connected to said lever proximate and end remote from said first end and extending longitudinally from said bracket.

8. The safety belt retractor of claim 7 including a belt buckle receiving socket positioned on the free end of said push member and facing outwardly thereof.

* * * * *

UNITED STATES PATENT OFFICE
CERTIFICATE OF CORRECTION

Patent No. 3,695,546                    Dated October 3, 1972

Inventor(x) TAKEZO TAKADA

It is certified that error appears in the above-identified patent and that said Letters Patent are hereby corrected as shown below:

-- [30]  Foreign Application priority Data

December 3, 1969 Japan...............44-114342 --

Signed and sealed this 3rd day of April 1973.

(SEAL)
Attest:

EDWARD M.FLETCHER,JR.                ROBERT GOTTSCHALK
Attesting Officer                    Commissioner of Patents